United States Patent [19]

Smith et al.

[11] Patent Number: 5,548,490
[45] Date of Patent: Aug. 20, 1996

[54] SUNLIGHT COLLECTING AND TRANSMITTING SYSTEM

[75] Inventors: Geoffrey B. Smith, Epping; James B. Franklin, Sydney, both of Australia

[73] Assignees: Skydome Industries Limited; University of Technology, Sydney, both of NSW, Australia

[21] Appl. No.: 211,105
[22] PCT Filed: Sep. 21, 1992
[86] PCT No.: PCT/AU92/00499
    § 371 Date: May 16, 1994
    § 102(e) Date: May 16, 1994
[87] PCT Pub. No.: WO93/06413
    PCT Pub. Date: Apr. 1, 1993

[30] Foreign Application Priority Data

Sep. 19, 1991 [AU] Australia ................... PK8471

[51] Int. Cl.⁶ ..................................................... F21V 8/00
[52] U.S. Cl. .............. 362/32; 362/84; 362/300; 362/301; 236/259
[58] Field of Search ............. 362/84, 311, 307, 362/260, 300, 302, 304, 301, 297; 136/259; 323/906

[56] References Cited

U.S. PATENT DOCUMENTS 4,539,625   9/1925   Bornstein et al. ............. 362/32

FOREIGN PATENT DOCUMENTS

| 114214 | 5/1986 | Japan . |
| 114206 | 5/1986 | Japan . |
| 266502 | 5/1986 | Japan . |
| 3-8207 | 1/1991 | Japan . |
| 3-109509 | 5/1991 | Japan . |

*Primary Examiner*—Ira S. Lazarus
*Assistant Examiner*—Thomas M. Sember
*Attorney, Agent, or Firm*—Abelman, Frayne & Schwab

[57] ABSTRACT

A lighting system for an interior of a building includes a device for collecting and converting sunlight into concentrated light consisting of a stack of fluorescent sheets. The collecting device is optically coupled, preferably by way of an optical joint to a channelling member such as an optical cable, so that the concentrated light passes to the channelling member and is channelled to a light emitting fitting for the interior of the building. The channelling members are formed such that their cross-sectional shape changes from the cross-section of the collecting device to the cross-section of the channelling members with an approximately constant cross-sectional area being maintained throughout the change of cross-sectional shape, whereby the coupling device is an optical joint created by a medium having a refractive index close to that of the collecting device and channelling members.

6 Claims, 3 Drawing Sheets

SUNLIGHT COLLECTING AND TRANSMITTING SYSTEM

FIELD OF INVENTION

The present invention relates to a sunlight collecting and transmitting system that may be used to illuminate the interior of buildings, ships, mines and the like. The invention may be adapted for use with skylights.

BACKGROUND ART

Electrical lighting systems are very inefficient and can contribute significantly to air conditioning loads, thereby increasing overall electricity costs. For instance, incandescent lights waste about 97% of their electrical energy as heat, and fluorescent lights waste about 90%.

In contrast, the sun is a high intensity energy source of freely available sunlight. In order to take advantage of this energy source, sunlight collectors can be made that are small and light enough to be mounted on conventional roofs, walls, window sills and the like, without the need for flashing or any significant structural alterations.

Attempts have been made to design such sunlight collectors. U.S. Pat. No. 4,539,625 describes a lighting system for a building interior that utilizes a solar light receiving stack of luminescent concentrators connected to an optical conduit consisting of optical fibers that transmit light to a fixture located in the area to be illuminated. However, the stack and optical conduit are very wide and this poses physical difficulties in installing the system since the stack located on the outside of the building will need to communicate with the optical conduit located in the interior by passing through a similarly wide aperture in the building wall or like barrier between inside and outside.

Additionally, a very wide optical conduit will have limited flexibility and accessability and so may not be able to access locations remote from the solar light receiving stack.

On the other hand, a relatively narrow, thin and flexible optical conduit would forseeably pose fewer, if any, problems in installation and accessibility to remote locations.

The solar light receiving stack or collector of U.S. Pat. No. 4,539,625, because of its relatively large width to length ratio, will only have an appreciable contribution from total internal reflection at the top surface, the bottom surface and the end opposite the optical conduit. There is no appreciable contribution from total internal reflection at the collector side edges. It is therefore reliant upon having a correspondingly wide optical conduit.

Furthermore, it is reliably anticipated that due to design flaws, the output colour of light from the system of U.S. Pat. No. 4,539,625 will not be neutral or near neutral.

It is therefore an object of the present invention to provide an improved means for lighting the interior of a building or the like which involves collecting sunlight and transmitting it to the interior of the building or the like.

DISCLOSURE OF THE INVENTION

According to the invention, there is provided a lighting system for an interior of a building and the like, comprising:
(i) means for collecting and converting sunlight into concentrated light,
(ii) means for channelling the concentrated light to a light emitting fitting for the interior of the building or the like, and
(iii) means for optically coupling the sunlight collecting and converting means with the channelling means.

In a preferred form of the invention, the collecting means is a two layer stack of luminescent sheets having a dye arrangement so as to produce light of the desired colour balance which preferably is a neutral or near neutral colour. Preferably, the luminescense is in the form of fluorescence, but may also be phosphorescence.

Preferably, the two layer stack consists of an upper sheet and two lower sheets arranged end to end, each sheet including a particular type of dye or combination of dyes and a sufficient amount of dye or dyes so that the overall combination of dyes in the collector results in light of the desired colour balance.

In alternative forms of the invention the collecting means can be a single layer tandem arrangement of fluorescent sheets or a three layered stack of fluorescent sheets.

Alternatively, the collecting means is a two layer stack of two fluorescent sheets in tandem in the upper layer and two fluorescent sheets in tandem in the lower layer.

In a further broad form of the invention the collecting means is a concentric arrangement of three fluorescent tubes, with each tube including a particular type of dye or combination of dyes and a sufficient amount of dye or dyes so that the combination of dyes in the collector results in light of the desired colour balance.

The collecting means may be a concentric arrangement of an outer fluorescent tube and an inner tandem arrangement of two fluorescent tubes, a concentric arrangement of two outer tandem fluorescent tubes and two inner tandem fluorescent tubes, or a coaxial tandem arrangement of three fluorescent tubes.

Preferably, the channelling means is an optical cable. It is also preferred that the channelling means is flexible.

The channelling means may be connected to the collecting means by an optical joint created by a medium having a refractive index close to that of the collecting means and channelling means.

It is also preferred that the collecting means has a relatively large length to width ratio.

The coupling means may be formed such that its cross-sectional shape changes from the cross-section of the collecting means to the cross-section of the channelling means with an approximately constant cross-sectional area being maintained throughout the change of cross-sectional shape. Preferably, the cross-sectional shape change of the coupling means is smooth.

The sheets or tubes of luminescent material may also be a liquid of appropriate dye arrangement contained within transparent walls so that light is trapped therewithin by total internal reflection. The liquid must be a solvent for the dyes used.

A lighting system as hereinbefore defined may be provided for each room or area that is to be illuminated. Alternatively, a single collecting means may be coupled to a plurality of flexible optical cables, so that each cable may be directed to different locations within the building.

BRIEF DESCRIPTION OF THE DRAWINGS

In order that the invention may be more readily understood and put into practical effect, reference will now be made to the accompanying drawings in which:

FIG. 7 is an isometric view of a portion of a channelling means connected to a light emitting fitting for the interior of a building and the like.

DESCRIPTION OF PREFERRED EMBODIMENTS

Figure 1:
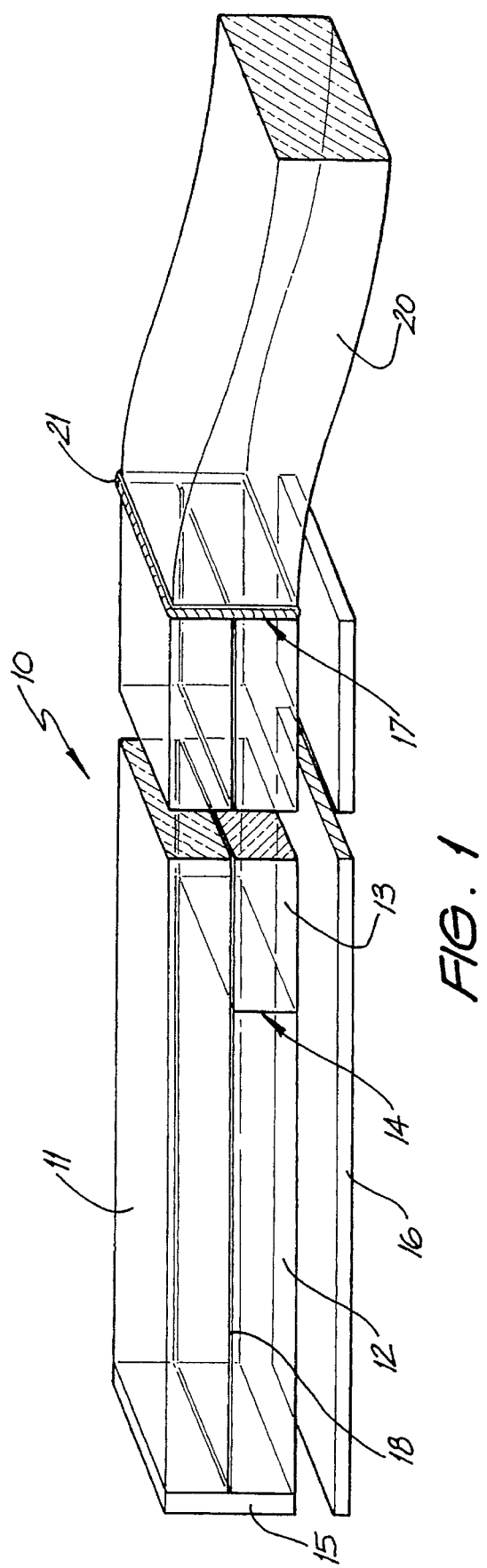
FIG. 1 is an isometric view of a sunlight collector and transmitter according to a preferred embodiment of the invention which yields a neutral or near neutral colour for the light output.

The sunlight collector and converter 10 of FIG. 1, has an upper polymethyl methacrylate (PMMA) sheet 11 coloured with a fluorescent violet/blue dye. PMMA is commonly known as perspex (trade mark). The violet/blue dye is 4-acetamidonapthalimide. Another violet/blue dye that may be used is 4, 5-dimethyloxy-N-(2-ethyl hexyl) napthalimide which is sold by BASF under the trade mark LUMOGEN 570 (Fluorescence Brightener 331).

There are two lower PMMA sheets 12 and 13 that are separated from each other by an optical joint 14. This optical joint consists of a transparent medium with a refractive index close to the refractive index of the adjacent sheets 12 and 13. A butt joint can be used but is not as efficient. The lower sheets 12 and 13 are both separated from the upper sheet 11 by a small air gap 18 of down to about 5 microns created by having peripheral raised portions or spacers (not shown) in the otherwise flat upper surface of the sheets 12 and 13.

A similar spacing may also be provided by using a transparent teflon or plastic sheet.

The PMMA sheet 12 is coloured with a fluorescent red dye, perylene-1,8,7,12-tetraphenoxy-3,4,9,10-tetracarboxylic acid bis-(2',6'-diisopropylanilide), which is sold by BASF under the trade mark LUMOGEN 300.

The PMMA sheet 13 is coloured with a fluorescent green dye, isobutyl 4,10-dicyanoperylene-3,9-dicarboxylate, which is marketed as a "yellow" dye and sold by BASF under the trade mark LUMOGEN 083.

Other colours such as the orange dye perylene-3,4,9,11-tetracarboxylic acid bis-(2',6'-diisopropylanilide) which is sold by BASF under the trade mark LUMOGEN 240 might also be used and may replace the red dye, because of its property of less self absorption of light.

PMMA may be substituted by any plastic or glass known to be suitable for the present invention by persons skilled in the art. In the case of glass sheets, inorganic dyes may be used.

The dye concentrations that will be used will depend on the dimensions of the sheets, but will normally be in the range of 0.004% to 0.02% W/W. These concentrations and the specific dyes chosen together contribute to providing the desired output colour, which in most preferred cases, is neutral or near neutral.

Each of the PMMA sheets is coloured with the appropriate dye or dyes preferably during the making of the sheet, which may be by any of the processes of injection moulding, extrusion or forms of casting.

For instance, as PMMA is a polymer, incorporation of the dye or dyes may occur during the catalysed polymersation reaction that forms the PMMA from monomers of methyl methacrylate. In this embodiment, both the monomer and dye or dyes are in liquid form and the resultant liquid mixture can be cast as a sheet.

Alternatively, the PMMA may be in the form of ready made polymer beads. The PMMA beads may be melted and the liquid dye or dyes then added, or the PMMA beads may be present with dye beads and the mixture of beads melted. With either approach, a molten mix of polymer and dye or dyes is formed that can then be cooled and cast as a sheet.

The casting is preferably done by injection moulding so that all the surfaces of the sheet have a high quality smoothness. However, the sheet may be cast between glass plates and whilst this may result in good quality smoothness for the top and bottom surfaces, the side edges may still need to be cut and polished to provide the necessary high quality smoothness. To avoid the necessity of polishing the edges, the sheet may be cast inside a teflon jacket of appropriate cross-section.

Alternatively, the molten polymer/dye mixture may be formed into sheets by extrusion. A high quality smoothness of the top and bottom surfaces and side edges of the PMMA sheets will enhance the light concentrating and output capacity of the collector of FIG. 1. A rough surface or edge causes loss of light from within the sheet to the outside with the resultant reduced output capacity of the collector.

In another form, the dye or dyes may be diffused and incorporated into a ready made PMMA sheet with the aid of solvents, such as chloroform, however this is unlikely to be feasible on an industrial scale.

The collector 10 has a high quality mirror 15, that may be separate from or integral with one end of the PMMA sheets 11 and 12. Depending on the smoothness of the sheet edges, the total length of the collector and the dyes used, this rear mirror 15 can enhance output by a factor of between 1.4 and 2.0.

Spaced apart from and beneath the collector 10 is a specular or diffuse reflector 16, such as aluminium foil, a metallized plastic sheet or a white painted surface.

In FIG. 1, the height of each sheet is exaggerated in proportion to its width and its length. This is also the case for FIGS. 2 and 3, and is done for the sake of clarity. In fact, each sheet 11 to 1S has a height and width determined by the dimensions of the light channelling means (and vice-versa). (A preferred light channelling means will be described in detail later). That is, the cross-sectional dimensions of the collector 10 and the light channelling means should be close to matching for maximum light transmission.

Figure 4:
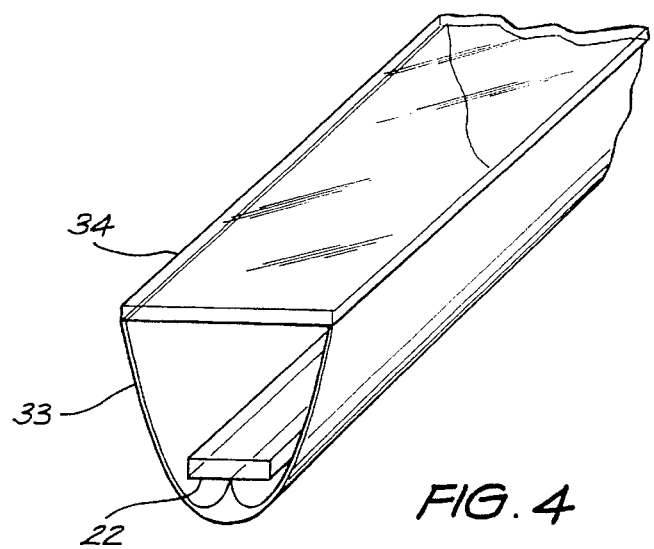
FIG. 4 is an isometric broken away view of the collector of FIG. 2 housed within a compound parabolic reflector (CPC)

Typical collector dimensions might be a width of 60 to 70 mm and a height of about 4 mm (2 layers, about 2 mm each in height with a very small air gap in between). The collector length then governs the output intensity, and the red and green sheets, for the aforementioned dyes, work well if these sheets are about half the total length of the sheet with the violet/blue dye. The length would also depend on whether there is any external concentration of the incoming radiation, for instance, by a stationary, compound parabolic reflector or concentrator (CPC) such as shown in FIG. 4. If a CPC is not used, then a total collector length of between about 1 and 2 meters will be sufficient to light a domestic room as long as losses of the light from the channelling means are not more than 30% (this applies for a channelling means up to about 10 m in length) and the coupling of collector with channelling means is at high efficiency.

The output end surface of the collector 10 is planar due to the two overlaid sheets ending flush with each other.

Sunlight, either as specular (direct) or diffuse light, will enter the collector 10 primarily through the upper or top surface of the sheet 11, although some sunlight may enter the collector 10 through the side surfaces or edges, and even less sunlight may enter through the bottom surface. A small proportion of sunlight will be reflected by all the surfaces or walls of the sheets. Once the sunlight has penetrated the sheets, the collector 10 will absorb the radiation of the sunlight at wavelengths that correspond to the absorption spectra of the various dyes in the sheets Part of the subsequent fluorescent emission from the dyes is trapped within the collector by total internal reflection off the sheet top and bottom surfaces and side edges. This light is ultimately channelled within the sheets 11 to 13 to the channelling means 20.

For instance, sunlight passing into the violet/blue sheet 11 may be absorbed by a molecule of the dye 4-acetamido napthalimide and the molecule caused to emit energy at a wavelength corresponding to violet/blue light. This light may be emitted in any direction. It may pass to the red sheet 12 where some is absorbed, to the green sheet 13 where most is absorbed, to the mirror 15 where it will be reflected back into the collector, or be emitted from the sheet 11 via the end or side surfaces.

Light passing through the red sheet 12 may be reflected back off the mirror 15, enter the green sheet 13, leave the red sheet 12 and be reflected off the diffuse reflector 16 or be emitted from the sheet 12 via the side surfaces. Some light may pass from the red sheet 12 to the violet/blue sheet 11. Light passing through the green sheet 13 may enter the violet/blue sheet 11 or the red sheet 12 where some is absorbed or leave the green sheet is either through the bottom surface where it may be reflected off the diffuse reflector 16, or through the end or side surfaces.

The combination and spatial distribution of coloured sheets in the collector 10 creates a blend of light that, when mixed in the channelling means or when emitted therefrom, has a neutral or near neutral colour. Although some light is emitted and lost through the surfaces of the sheets, most of the light that is directed from within the PMMA against the PMMA-air interface undergoes total internal reflection in accordance with the characteristic refractive index values of both PMMA and air. This ensures that most of the light that is within the collector is concentrated and, with the aid of the mirror 15 is directed towards the end surface 17.

Furthermore, the positioning of the green sheet downstream of the red sheet ensures that the red light emitted by the LUMOGEN 300 dye, which is of a longer wavelength than green light, can pass through the green sheet with limited absorption by the LUMOGEN 083 dye. If absorption by the green dye is significant or at undesirable levels, the upper part of the collector may include a sheet coloured with the red dye, which will be located tandemly with the violet/blue sheet. The upper red sheet should contain enough red dye so as to compensate for the significant or undesirable absorption levels by the green dye.

Figure 2:
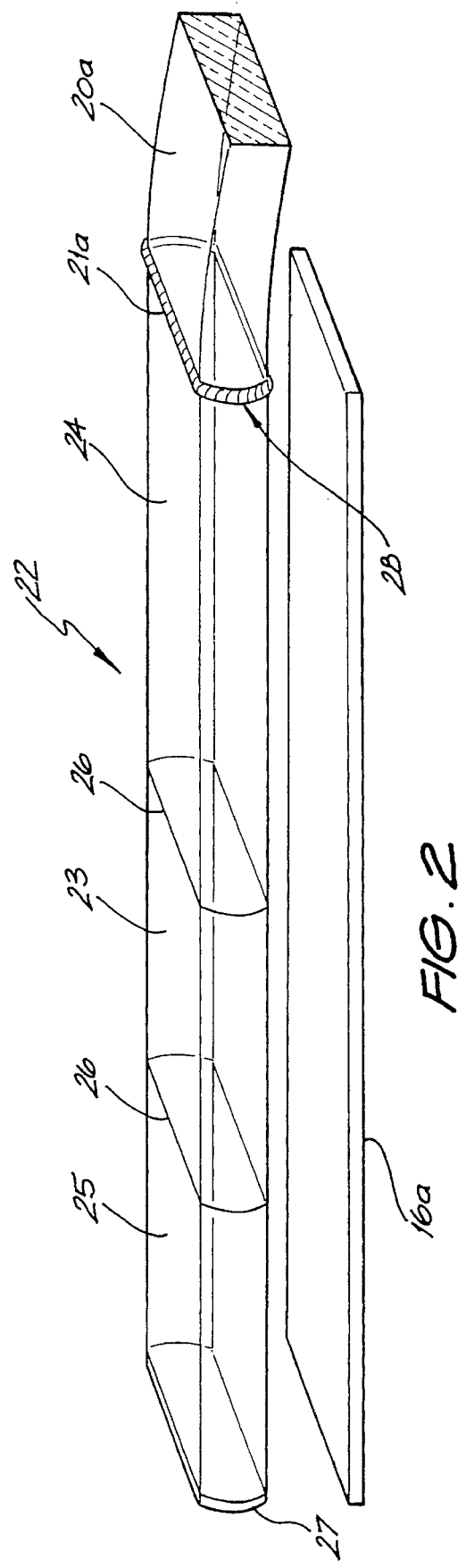
FIG. 2 is an isometric view of a single layer tandem sunlight collector and transmitter according to another embodiment of the invention.

In another embodiment of the invention, the two layer stacked arrangement of the collector 10 may be replaced by a single layer tandem collector 22 of the three coloured PMMA sheets as shown in FIG. 2. The tandem collector 22 is of a green sheet 23 sandwiched by a violet/blue sheet 24 on one side and a red sheet 25 on the other side. An orange sheet may replace the red sheet if desired.

In this arrangement, there is an optical joint 26 between both the red and green sheets and the violet/blue and green sheets. A high quality mirror 27 is flush with one end surface of the red sheet 25 so that light is concentrated and directed towards the violet/blue sheet 24 from where it is emitted from an end surface 28 through an optical joint 21a to a channelling means 20a.

Most of the sunlight that enters the tandem collector 22 does so via the upper surface of each of the three sheets 23, 24 and 25. The order of the coloured sheets that most of the light entering the red sheet 25 may follow, (namely from red to green to violet/blue) reflects a decrease in the wavelengths of light absorbed and retransmitted by the dyes. The longer wavelength transmitted red light will pass through the shorter wavelength absorbing green and violet/blue dyes without being substantially absorbed. Spaced apart from and beneath the collector 22 is a specular or diffuse reflector 16a, similar to that shown in FIG. 1, such as aluminium foil, a metallised plastic sheet or a white painted surface.

The combination and spatial distribution of the coloured sheets creates a blend of light that is emitted from the end surface 28 of the violet/blue sheet with a neutral or near neutral colour.

In a still further embodiment of the invention, the collector may be a three layered stack 10a of PMMA sheets containing fluorescent dyes. As shown in FIG.. 3, the preferred arrangement of the three layered stack for maximum utilization of incident solar radiation is to have the shortest wavelength absorbing sheet 11a (blue/violet) on top, the longest wavelength absorbing sheet 12a (red) at the bottom of the stack and the intermediate wavelength absorbing sheet 13a (green) in the middle of the stack. An orange sheet may replace the red sheet if desired.

The output surfaces of each sheet in such a three layered stack collector should be aligned in a plane 17a for coupling, such as by optical joint 28a, to the one chaneling means 20b. Channelling means 20b concentrates light to a light fitting 51 of building 52. In order to produce a neutral or near neutral output colour, the dye concentrations in sheets 12a and 13a will be reduced by a factor of about 2 compared to a two layer stack as shown in FIG. 1. An advantage of this three layered stack collector 10a is that, if required, multiple channelling means can be connected to more than one edge.

As with the collectors of FIGS. 1 and 2, there is a high quality mirror 27a located at the end surface of the collector 10a remote from the channelling means 20b, and there is also a specular or diffuse reflector 16b beneath the collector 10a.

Figure 3:
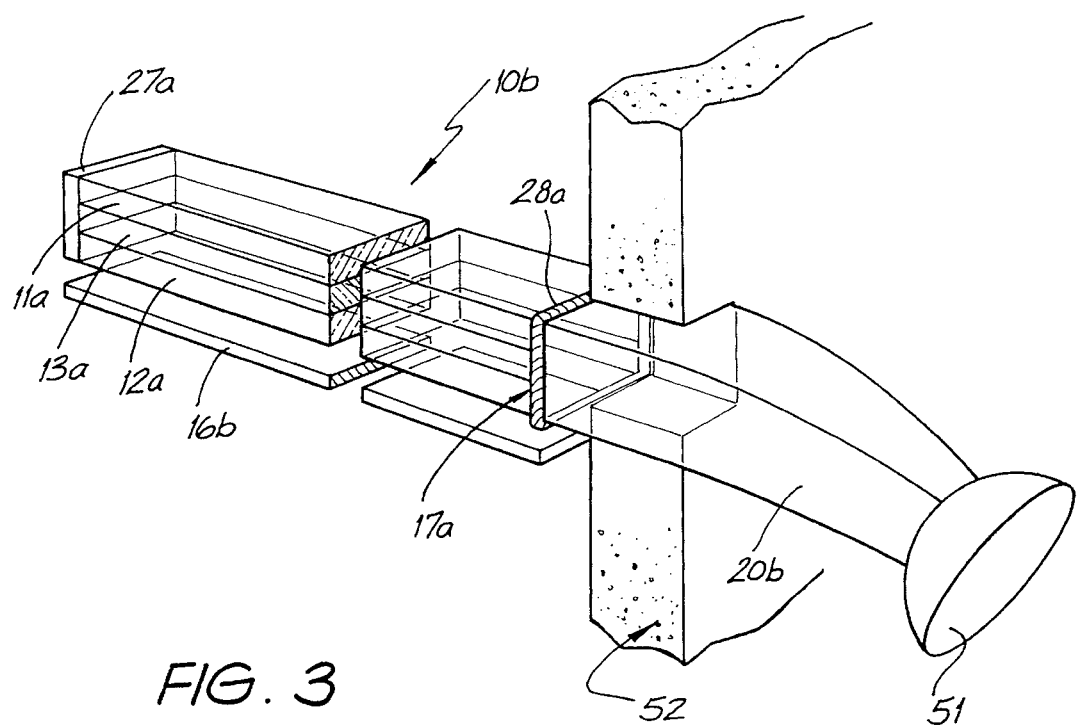
FIG. 3 is an isometric view of a three layered stack sunlight collector and transmitter according to yet another embodiment of the invention.

The collector of FIG. 1, the tandem collector of FIG. 2 and the three layered stack collector of FIG. 3 (all as aforementioned) may be surrounded by a transparent layer or cover to protect the collector against damage from the environment. In most instances of use, this protection will be essential for effective long term performance. The transparent layer may include a UV blocking acrylic additive that allows UV light of wavelength greater than about 345 nm to pass through, but blocks lower wavelength UV that may damage the dye molecules and lead to progressive deterioration of the active dye levels in each sheet, particularly the LUMOGEN 570 violet/blue dye. UV light of wavelength greater than about 345 nm can be converted or shifted to a violet/blue wavelength and therefore can be used by the preferred collectors of the present invention.

FIG. 1 also shows a leading portion of a flexible optical cable 20 (that serves as a light channelling means or optical light pipe system) aligned closely with and glued to the end surface 17 of the collector 10. The glue 21 has a refractive index close to that of the PMMA sheets of the collector 10 and the cable 20 so that an optical joint is present. The glue is preferably optical grade epoxy resin. The cable 20 is of a uniform cross-sectional area along its length. The channelling means shown in FIGS. 2 and 3 are also, preferably, optical cables and a suitable glue is the preferred form of optical joint.

Other means of creating an optical joint between the collector and optical cable may be used. If a butted joint is used, this may result in reflection at the joint which will have the effect of reducing transmission efficiency from between 96% and 98% characteristic of an optical glue joint to between 90% and 92% or lower. Gluing the collector end to the optical cable so as to form an optical joint also overcomes the effects of roughness at either of the edges bordering the joint.

Figure 5:
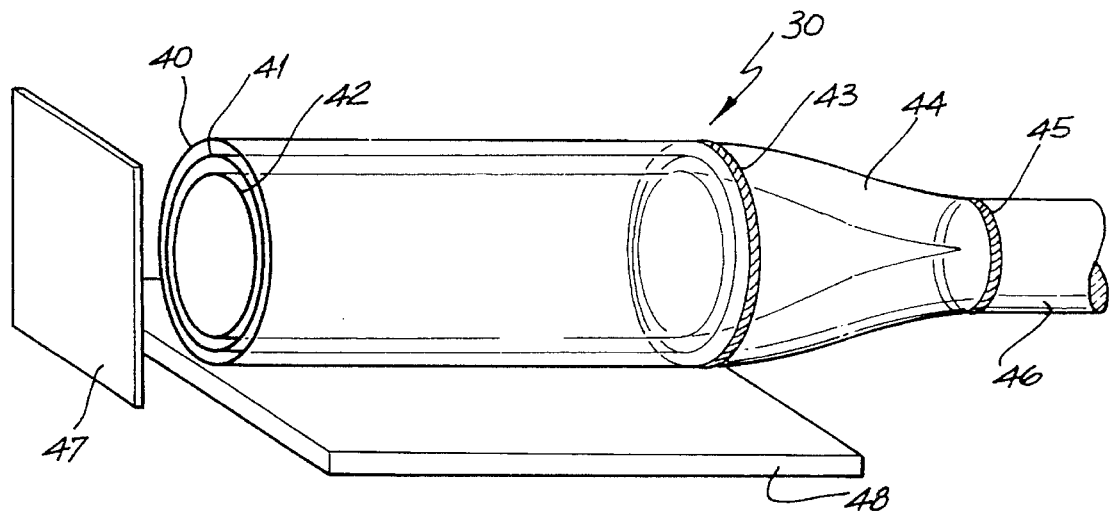
FIG. 5 is an isometric view of a three tube concentric sunlight collector and transmitter according to still another embodiment of the invention.

The cable 20, and each of the cables of FIGS. 2, 3 and 5, is preferably composed of a plastic copolymer of diethylene glycol his (allyl) carbonate (known in the optical industry as CR-39 and used for making lens) and methyl methacrylate. The two monomers are mixed in approximately equal volume and allowed to partially polymerize and partially crosslink in the presence of a catalyst, such as 0.1% W/V benzyl peroxide. The polymerisation reaction is stopped before complete cross-linking can occur so as to allow the resultant copolymer to be structurally flexible. The copolymer also has a high light transmitting quality.

The optical cable 20 is preferably continuous and is used in the form of a flexible ribbon. However, if desired, some sections of the cable 20 may be rigid. For normal applications, the cable may be between about 5 m and about 20 m in length. Longer cable lengths require larger collectors or higher concentration capacity.

If several parallel cables are run off one collector edge then for maximum efficiency of light transmission the heights of each cable should match the collector height. For the collector of FIG. 1 each sheet can be half of the cable height. A different height for each, coming to the same total, could be used if it was advantageous to vary the dye concentrations or sheet thicknesses.

The top and bottom surfaces and side edges of the cable 20 have a high quality smoothness and this ensures that there is very little loss of light through these walls as it is transmitted through the cable. A rough cable wall will produce a scattering of light from that wall to the outside.

In the system of FIG. 1, light emerging from the end surface 17 of the collector 10 is automatically confined to travelling at angles that allow the light to propogate down the cable 20. That is, cable 20 and collector 10 have the similar numerical apertures. If the cable top and bottom surfaces and side edges are very smooth, no significant losses occur from the cable through the walls and the only losses, if they occur, will be due to any absorption and microscopic defects in the cable copolymer structure. Very smooth cable surfaces and edges will therefore ensure that the light entering the cable from the collector will be channelled through the cable with minimal losses.

The cables of FIGS. 2, 3 and 5 should also be so designed that there is very little loss or scattering of light therefrom. Generally up to a 2% to 3% loss of light intensity per meter of cable is acceptable, but anything beyond that, perhaps as a result of unsmooth surfaces, should be avoided, particularly where a cable over 20 m in length is being used.

A cable having high quality smooth walls may be produced by casting the mixture of the two monomers into an inert thin walled tube or jacket having the appropriate profile and very smooth inner walls. Suitable materials include PTFE, FEP and PFA which are teflon polymers. After casting and setting to the desired shape, the jacket may be retained about the solid copolymer to protect the cable. The solid copolymer once formed from its component monomers shrinks slightly away from the jacket leaving a small air gap. Having an air boundary improves total transmittance. The cable will therefore include an outer jacket that will serve to protect it from damage, such as surface scratching, that might lead to loss of light from the cable.

The presence of a jacket surrounding the cable also provides an air gap that creates a cable/air interface that facilitates total internal reflection of light within the cable. This is in contrast to some prior art systems which spray a protective material onto the cable surface, thereby creating a cable/protective layer interface that is not as effective an interface for internal reflection of light as a cable/air interface. An additional nylon protective covering over the inner jacket may also be used.

The downstream end of the cable may be connected to a light fitting, such as a diffuse reflector or transluscent surface, so that the substantially forward travelling light that is transmitted through the cable may be spread out over a wider space in the room or area to be illuminated.

Alternatively, the cable itself may serve as the light source for the area being illuminated. This can be done either by roughening an end portion of one surface of the cable (preferably all or part of the cable undersurface that is within the room to be illuminated, if the cable is mounted near the ceiling of a room) and having a mirror at its end surface, or simply directing the end surface of the cable towards the area to be illuminated and letting the light that leaves the end surface form a progressively widening area of illumination. However, this will most effectively be done with the aid of a suitable light fitting.

The uniform cross-sectional shape of the cable 20 is in this instance, rectangular. It may, however, be more convenient in some instances for the collector 10 to be coupled to a cable having a cross-section that is substantially rectangular with semi circular sides. Alternatively, a cable for collector 10 may be produced having a cross-section that is substantially rectangular with corners that are quadrants of circles.

In yet another embodiment of the invention, the cable may consist of a collection of aligned small diameter optical fibres packed densely to match the cross-sectional area of the collector.

In cases where the cross-sectional shapes of collector and cable do not match, such as with a circular cross-section cable coupled to the output end surface of a flat sheet or rectangular cross-section collector, the coupling may be achieved by having an aligned array of small diameter or small width optical fibres that are densely packed to match the cross-sectional area of the collector at one end and the cross sectional area of the cable at the other.

In a still further embodiment of the invention, the collector may be a series of concentric tubes containing fluorescent dyes. Each tube is preferably thin walled and includes a particular type of fluorescent dye or dyes so that the combination of dyes in the collector results in light of the desired colour balance. This will typically be a neutral or near neutral colour.

Figure 6:
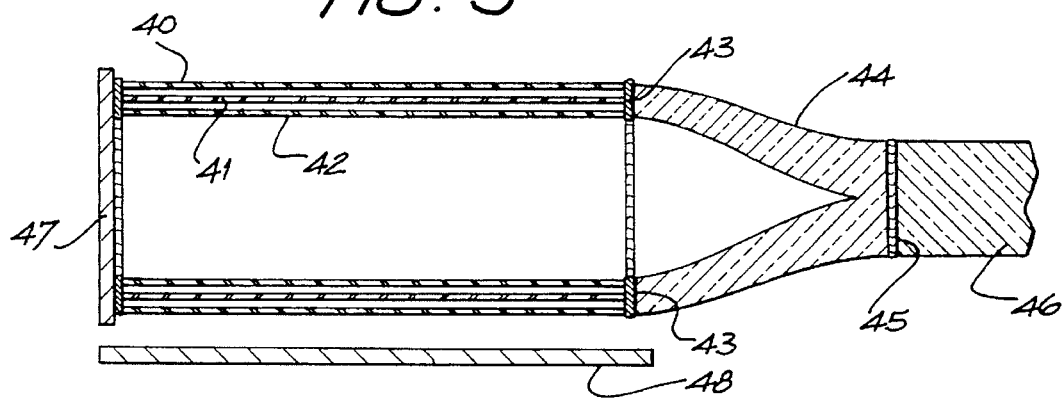
FIG. 6 is a cross-sectional view of a sunlight collector and transmitter of FIG. 5.

The tubular sunlight collector and convertor 30 of FIGS. 5 and 6 has three tubes 40, 41 and 42 connected by means of an optical joint 43 to a coupling means 44 which is in turn connected by means of an optical joint 45 to the channelling means 46. The optical joints 43 and 45 are preferably a medium having a refractive index close to that of the coupling means 44 (for example, optical grade epoxy resin). A butt joint may be used but is not as efficient. Welding (for example, ultra sonic or solvent) may be used if sufficiently good optical quality can be obtained.

The collector and convertor tubes of FIGS. 5 and 6 consist of an outer PMMA tube 40 coloured with a fluorescent violet/blue dye or dyes. The middle PMMA tube 41 is coloured with a fluorescent green dye or dyes. The inner PMMA tube 42 is coloured with a fluorescent red or orange dye or dyes.

The tubes 40, 41 and 42 are separated by small air gaps of down to about 5 microns. Short tubes can be held in place by appropriate spacers located at their ends only, but small spacers located intermediate to the tube ends may be used to maintain the alignment of longer tubes. The total cross-sectional area of all spacers touching a tube should be small compared to the cross-sectional area of the light transmitting portion of that tube.

The dye types and concentrations are similar to those described earlier with respect to the sheet type collectors of FIGS. 1, 2 and 3.

Each of the PMMA tubes 40, 41 and 42 is coloured with the appropriate dye or dyes preferably during the making of the tubes, which may be by any of the processes of injection moulding, extrusion or forms of casting. The PMMA tubes may also be made by diffusing the dye or dyes into a ready made PMMA tube with the aid of solvents, such as chloroform, but this is unlikely to be feasible on an industrial scale.

Preferably, each tube is a thin walled tube of circular cross-section. Other cross-sections including (but not limited to) ovals, ellipses, rectangles and triangles may be used. The hole in the innermost tube 42 may be omitted to make it a solid rod.

The tubes 40, 41 and 42 have a high quality of smoothness on the inner and outer surfaces to enhance the light concentrating and the output capacity of the collector 30.

The collector 30 has a high quality mirror 47 that may be separate from or integral with one end of the tubes. Depending on the smoothness of the tubes, the tube lengths and the dyes used, this rear mirror 47 can enhance the output by a factor up to 2.0. The mirror 47 has been axially displaced to an exaggerated extent for the sake of clarity in FIG. 5. Alternatively, a hemispherical shell (not shown) may be used at the end of each tube furthest from the coupling means 46. Each hemispherical shell is of the same initial cross-section as the tube it is connected to and may be separate from or integral with the end of the tube.

Spaced apart from and beneath the collector 30 is a specular or diffuse reflector 48 such as aluminium foil, a metalised plastic sheet or a white painted surface.

FIGS. 5 and 6 show the thickness of the tube walls and the gaps between the tube walls in exaggerated proportion for the sake of clarity. Typical dimensions might be an external diameter of the outer tube 40 of 40 mm, a total wall thickness (includes all tubes plus the spaces between them) of 2 mm, a channeling means 46 of 18 mm diameter and a tube length of 1 meter to 2 meters. The total cross-sectional area of the light transmitting part of the tubes 40, 41 and 42 plus the spaces between them is approximately the same as the cross-sectional area of the channelling means 46.

The channelling means 46 is, in this embodiment, a flexible optical cable having a uniform cross-section along its length.

The coupling means 44, which may be made of undyed PMMA, functions by way of the collected light that enters from the collector 30 being transmitted therethrough by internal reflection to the channelling means 46. The end of the coupling means 44 nearest the collector 30 has a hollow tubular cross-section, the thickness of the tubular wall being preferably equal to the distance between the outermost surface of the outer tube 40 and the adjacent innermost surface of the inner tube 42.

The cross-sectional area of the tubular wall of the coupling means 44 is approximately the same as the cross-sectional area of the end of the coupling means 44 nearest the channelling means 46, even though the cross-sectional shape of the coupling means 44 may change throughout its length.

In another embodiment of the invention the inner concentric green and red/orange tubes are replaced by a single tube with a red/orange portion in tandem with a green portion, with the green portion being closest to the coupling means.

In yet another embodiment of the invention, an outer tube consisting of a red/orange portion is in tandem with a blue portion with the blue portion being closest to the coupling means. The single concentric inner tube has a red/orange portion in tandem with a green portion with the green portion being closest to the coupling means.

Another embodiment of the invention utilises a single tube consisting of a red/orange portion in tandem with a green portion and then a blue portion with the blue portion being closest to the coupling means and the red/orange portion being furthest from the coupling means.

The three tube concentric collector 30 of FIGS. 5 and 6 and the tubular tandem collectors with one tube or two concentric tubes (all as aforementioned) may be surrounded by a transparent layer or cover to protect the collector from the environment. The structure, function and advantages of such a cover are similar to those for a sheet based collector discussed earlier.

The principle advantage of tubular fluorescent collectors stems from the fact that the tubular collector has no sharp sides or corners. Thus, there are no side losses and no sides to polish. Another advantage is that, when properly orientated, this type of system has superior light output over the year compared to a planar sheet system of similar size. Another advantage is that optical cables of circular cross-section are readily available. Yet another advantage is the ease of coupling to a compound parabolic concentrator.

The present invention may be adapted for use with parabolic reflectors or nonimaging concentrators. For instance, the collector of any one of FIGS. 1, 2, 3 and 5 may be located within a compound parabolic concentrator (CPC) 33 shown in FIG. 4 such that the light that is concentrated by the CPC 33 is directed against the surface of the collector. For convenience, FIG. 4 shows the collector 22 of FIG. 2 located within CPC 33. However, the collectors 10, 10a and 30 may each be located in the CPC 33, when desired, in an appropriate manner. There is a protective cover 34 over the top of the CPC 33 and the inner walls of the CPC 33 are metallized to optimize reflection. If the CPC is about 120 mm wide, then for a 80 mm wide collector, the intensity of light received at the outer surface(s) of the collector is roughly doubled. Adjustment of the structure of the compound parabolic concentrator may result in even higher concentration powers, such as up to 3 times.

These concentration levels are low to avoid the need for any adjustment with the seasons. Larger concentrations are possible if small adjustments are made a few times a year.

Alternatively, a CPC adapted for use with the collector means of the present invention may be made from a solid parabolic shaped block of PMMA of cross section similar to that shown in FIG. 4 with the collector means residing in a slot in the block. The slot may be so designed to receive the collector of FIGS. 1, 2, 3 or 5. The parabolic side surfaces of such a solid block CPC are metallised to provide the reflector surface. This design further enhances the collector concentration power by an additional factor of 1.5 beyond that for the CPC of the hollow type shown in FIG. 4.

Figure 7:
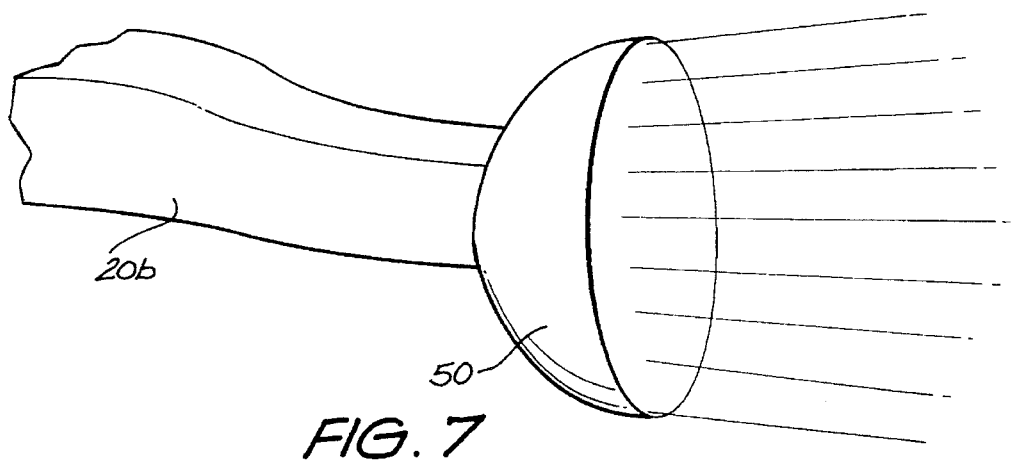

A light emitting fitting 50 connected to the channelling means 20b is shown in FIG. 7. The connection of the channelling means 20b to the fitting 50 may be by any appropriate means known to persons skilled in the art. The illustration of the fitting 50 is not intended to be limiting as any appropriate fitting may be used.

The light fitting 50 may incorporate a light sensor and a light valve controlled by that sensor with the light valve acting to regulate the light output of the system.

The light fitting 50 may include a source of artificial light, such as a metal halide lamp, used to supplement the light output of the system as required. The source may be inside the fitting or located remote from it with the light transmitted to the light fitting by a channelling means.

It is an advantage of the present invention that it can be readily adapted to enable a plurality of long thin optical cables to transmit light to remote and otherwise difficult to access locations within a building.

It is another benefit that such a plurality of cables may derive their light from a single collector source.

It is a further benefit that the relatively large length to width ratio of the collector of the present invention will take advantage of the property of total internal reflection of light within the collector to collect and concentrate light to produce a neutral or near neutral output colour that can be transmitted through long thin flexible cables to the area to be illuminated.

Various modifications may be made in details of design and construction without departing from the scope or ambit of the invention.

I claim:

1. A lighting system for an interior of a building and the like comprising:

(i) means for collecting and converting sunlight into concentrated light, said collecting means consisting of a stack of fluorescent sheets, the said stack being of a substantially rectangular prism shape having top and bottom surfaces, opposed side surfaces defining therebetween a width of the collecting means, and opposed end surfaces defining therebetween a length of the collecting means, wherein the length of the collecting means is greater than the width of the collecting means;

(ii) means for channelling the concentrated light to a light emitting fitting for the interior of the building or the like;

(iii) means for optically coupling the sunlight collecting and converting means with the channelling means through one of the said end surfaces of the collecting means, wherein the coupling means is formed such that its cross-sectional shape changes from the cross-section of the collecting means to the cross-section of the channelling means with an approximately constant cross-sectional area being maintained throughout the change of cross-sectional shape, and wherein the coupling means is an optical joint created by a medium having a refractive index close to that of the collecting means and channelling means; and (iv) a compound parabolic concentrator for housing the collecting means, whereby sunlight is concentrated by the compound parabolic concentrator onto the collecting means.

2. The lighting system of claim 1 wherein the cross-sectional shape change of the coupling means is smooth.

3. The lighting system of claim 1 wherein the channelling means is an optical cable.

4. The lighting system of claim 1 wherein the channelling means is flexible.

5. The lighting system of claim 1 wherein the collecting means is a three layered stack of fluorescent sheets.

6. The lighting system of claim 5 wherein an uppermost layer of the stack of fluorescent sheets is colored with a fluorescent blue/violet dye, a lowermost layer of said stack is colored with a fluorescent red dye, and the layer intermediate said uppermost and lowermost layers is colored with a fluorescent green dye.

* * * * *